(12) United States Patent
Shoulders

(10) Patent No.: US 8,733,768 B1
(45) Date of Patent: May 27, 2014

(54) RACE CAR FOUR LINK BAR TO CHASSIS REMOTELY ADJUSTABLE BRACKETS

(71) Applicant: James R. Shoulders, Mineral, VA (US)

(72) Inventor: James R. Shoulders, Mineral, VA (US)

( * ) Notice: Subject to any disclaimer, the term of this patent is extended or adjusted under 35 U.S.C. 154(b) by 0 days.

(21) Appl. No.: 13/746,383

(22) Filed: Jan. 22, 2013

Related U.S. Application Data

(60) Provisional application No. 61/590,168, filed on Jan. 24, 2012.

(51) Int. Cl.
*B60G 3/18* (2006.01)

(52) U.S. Cl.
CPC .............. *B60G 3/18* (2013.01); *B60G 2200/13* (2013.01); *B60G 2204/143* (2013.01); *B60G 2204/1432* (2013.01)
USPC ......... 280/86.757; 280/124.116; 280/124.128

(58) Field of Classification Search
CPC .. B60G 3/18; B60G 2200/14; B60G 2204/14; B60G 2204/143; B60G 3/185

USPC ............ 280/124.128, 124.116, 86.75, 86.751
See application file for complete search history.

(56) References Cited

U.S. PATENT DOCUMENTS

| 4,453,738 | A |   | 6/1984 | Murata |
|---|---|---|---|---|
| 5,803,200 | A | * | 9/1998 | Brandt .......................... 180/348 |
| 6,095,563 | A |   | 8/2000 | Bushek |
| 6,698,775 | B2 |   | 3/2004 | Ness |
| 7,475,894 | B2 | * | 1/2009 | Hodge ................... 280/124.116 |
| 2005/0023790 | A1 | * | 2/2005 | Galazin .................. 280/124.116 |
| 2011/0068524 | A1 | * | 3/2011 | McCarthy et al. ............ 267/265 |
| 2012/0153589 | A1 | * | 6/2012 | McCarthy et al. ......... 280/86.75 |

* cited by examiner

*Primary Examiner* — James English
(74) *Attorney, Agent, or Firm* — Neustel Law Offices

(57) ABSTRACT

A race car four link bar to chassis remotely adjustable brackets for providing quick, efficient, and precise adjustment for trailing arms on a race car chassis. The race car four link bar to chassis remotely adjustable brackets generally includes adjustable brackets that include a pivoting load block (10), slotted bracket plates (20), a hemi joint carrier (30) and a lead screw (40).

16 Claims, 3 Drawing Sheets

400
RACE CAR FOUR LINK BAR TO CHASSIS REMOTELY ADJUSTABLE BRACKETS

CROSS REFERENCE TO RELATED APPLICATIONS

I hereby claim benefit under Title 35, United States Code, Section 119(e) of U.S. provisional patent application Ser. No. 61/590,168 filed Jan. 24, 2012. The 61/590,168 application is currently pending. The 61/590,168 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a four link bar suspension for a vehicle and more specifically it relates to a race car four link bar to chassis remotely adjustable brackets for providing quick, efficient, and precise adjustment for trailing arms on a race car chassis.

2. Description of the Related Art

Any discussion of the related art throughout the specification should in no way be considered as an admission that such related art is widely known or forms part of common general knowledge in the field.

There are many types of suspension systems that are currently being utilized in the automotive industry, specifically in the racing industry. Among these are ladder bar, torque arm, swing arm, three-link, and four-link suspension systems. Presently, four-link suspension systems are preferred for a variety of reasons. First, four-link suspension systems are compact in size. While typical ladder bars are about 34-36 inches in length, typical four-links are about 15-22 inches long. Four-link suspension systems provide a vehicle manufacturer with additional floor space which allows the driver to sit further rearward in the vehicle with respect to the front end of the vehicle and thus, under the main roll cage area. In four-link suspension systems the bars can face the front or the back of the car in reference to the rear axles allowing for even more clearance for the driver and drastically altered handling characteristics within the suspension. Locating a driver further rearward also allows more weight to be distributed towards the rear of the vehicle and thus, over the rear wheels. This also allows the driver to be more comfortable and gives the rear wheels of the vehicle more traction. Additionally, four-link designs make it easier to distribute loads to the rest of the chassis structure. U.S. Pat. No. 6,698,775 to Ness discloses a four-link vehicle suspension system and is hereby incorporated by reference into this application.

Current four-link systems also provide advantages over other known suspension systems because they provide a greater number of instant/center (I/C) choices than other suspension systems. The I/C or instant center is an imaginary point, determined as the center of a radius made by a moving suspension that is the point of lift (positive or negative). Moreover, current four-link suspension systems are also advantageous because they provide a wide range of possible location choices. These four-link systems further allow easy pinion angle changes, easy alignment of the rear to the centerline of a vehicle, and easy preload adjustments.

BRIEF SUMMARY OF THE INVENTION

The invention generally relates to a four link bar suspensions for a vehicle which includes adjustable brackets that include a pivoting load block (10), slotted bracket plates (20), a hemi joint carrier (30) and a lead screw (40).

An object is to provide race car four link bar to chassis remotely adjustable brackets for providing quick, efficient, and precise adjustment for trailing arms on a race car chassis.

Another object is to provide race car four link bar to chassis remotely adjustable brackets that easily adjust the trailing arm angle.

Another object is to provide race car four link bar to chassis remotely adjustable brackets that provide infinite trailing arm angle adjustment within a determined range.

Another object is to provide race car four link bar to chassis remotely adjustable brackets that allow for attachment of remote adjustment linkage.

Another object is to provide a race car four link bar to chassis remotely adjustable brackets that allow for easy access to the adjustment device.

Another object is to provide a race car four link bar to chassis remotely adjustable brackets that allows trailing arm to maintain factory side to side placement.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1A:
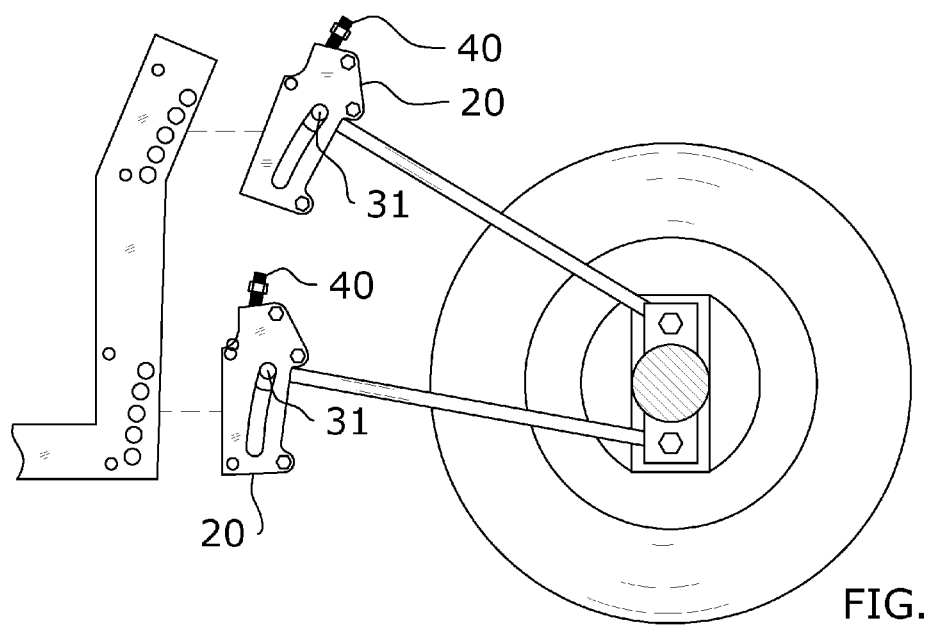
FIG. 1a is an elevation view depicting the invention connected to the four-bar links prior to installation into the standard manufacture chassis mounts.
Figure 1B:
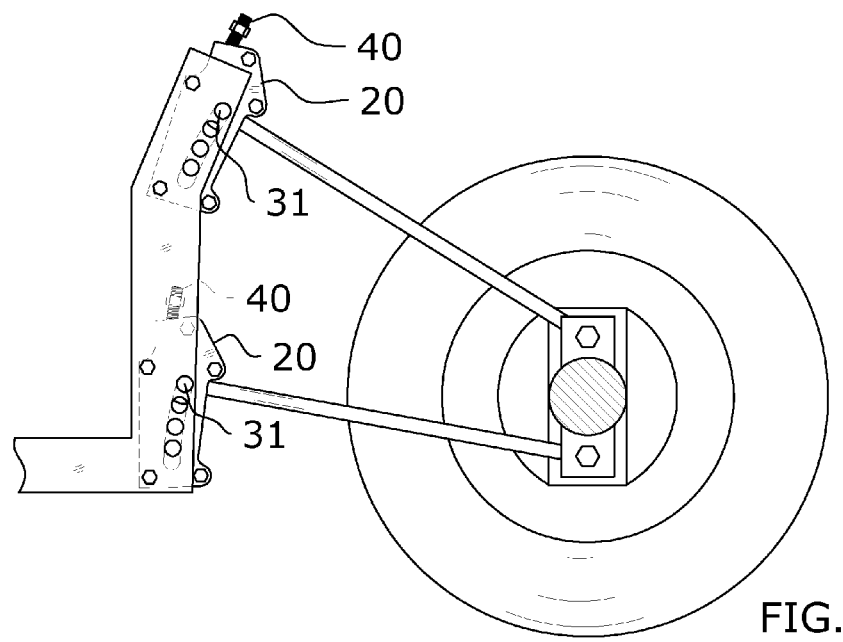
FIG. 1b is an elevation view depicting the invention connected to the four-bar links and installed into the standard manufacture chassis mounts.
Figure 2:
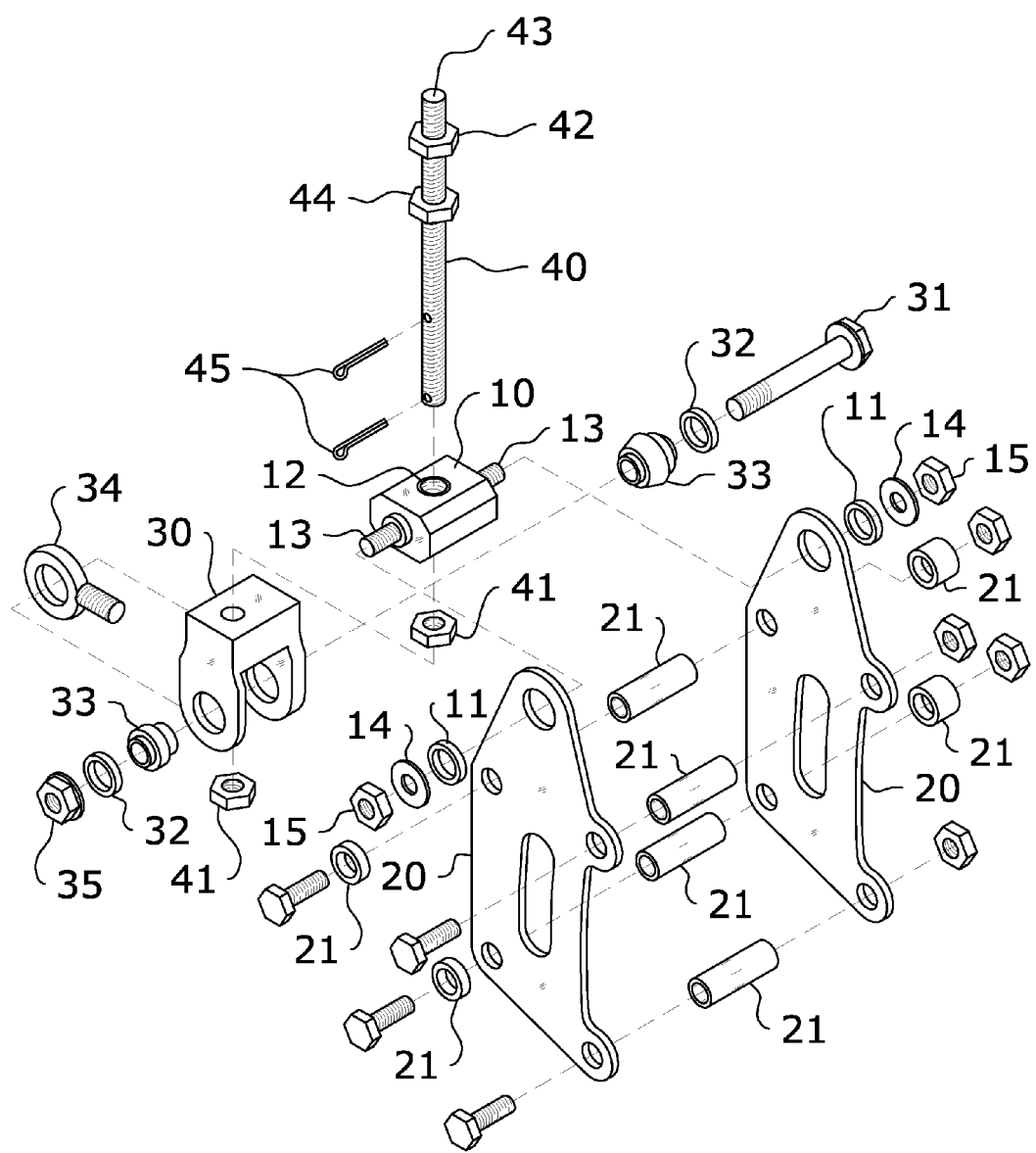
FIG. 2 is an assembly drawing of the invention in which all of the subcomponents are labeled.
Figure 3:
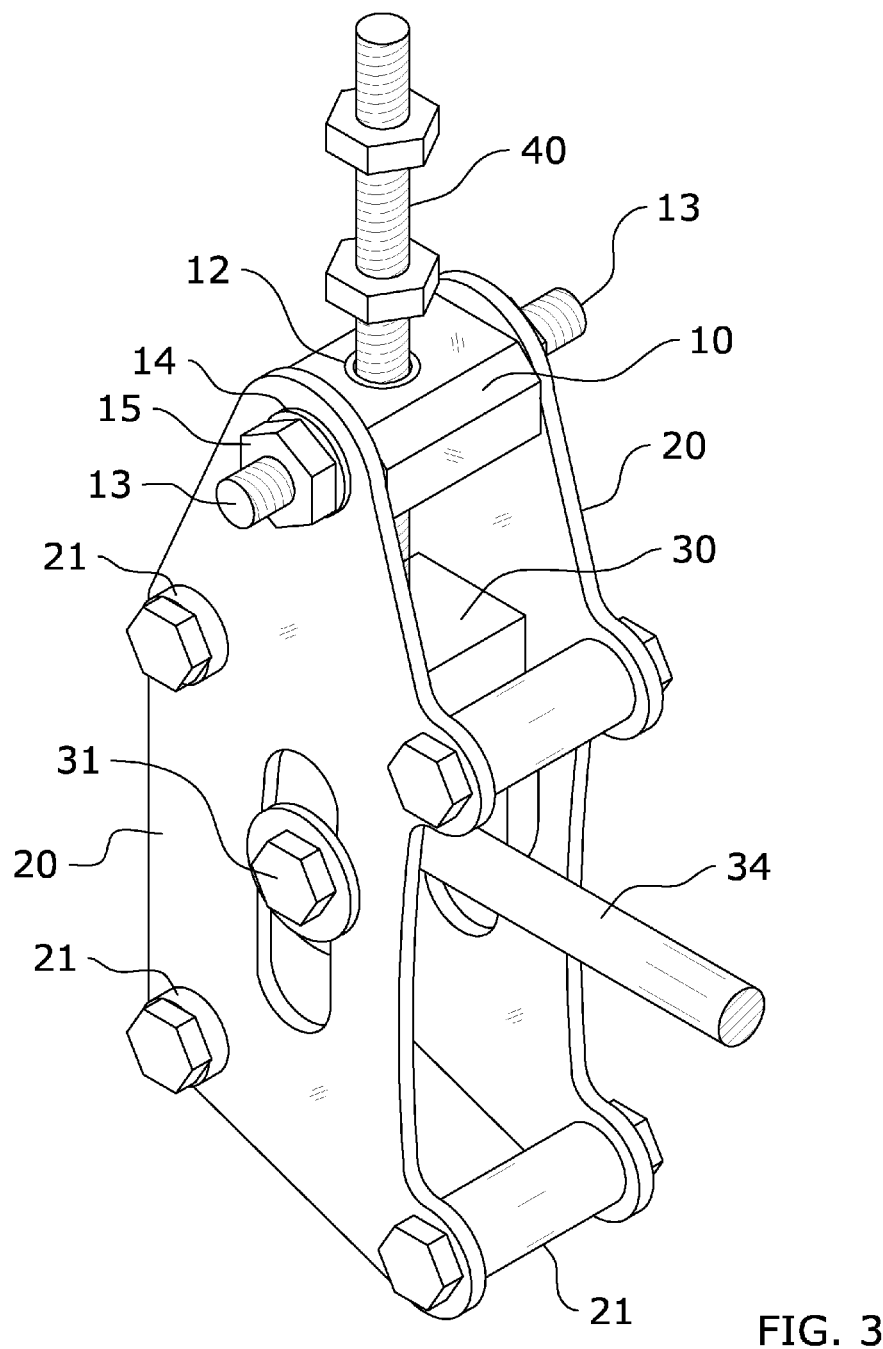
FIG. 3 is an isometric drawing of the invention, fully assembled, labeling the four main components.

A. Overview.

Turning now descriptively to the drawings, in which similar reference characters denote similar elements throughout the several views, the attached figures illustrate a race car four link bar to chassis remotely adjustable brackets, which comprises adjustable brackets that include a pivoting load block (10), slotted bracket plates (20), a hemi joint carrier (30) and a lead screw (40). U.S. Pat. No. 6,698,775 to Ness discloses a four-link vehicle suspension system and is hereby incorporated by reference into this application.

B. Pivoting Load Block.

This block is a rectangular block with two similar ends machined allowing for bushings to be placed on both ends. It also includes threads for the lead screw (40) and provides a pivot point when connecting to the slotted bracket plates (20) therefore, providing correct alignment for the hemi joint carrier (30) in comparison to the threads. This block bares the load created between the lead screw (40) and the hemi joint carrier (30) when the lead screw (40) is turned.

This block is drilled for a threaded insert (12) which matches the threads from the lead screw (40). Each end is machined in order to accept a pivoting load block bushing (11). These bushings minimize the wear between the pivoting load block (10) and the slotted bracket plates (20). Each of the machined ends are also drilled and threaded to accept the threaded stud (13). These threaded studs (13) along with the retaining washers (14) and retaining nuts (15) fasten the pivoting load block (10) to the slotted bracket plates (20). The pivoting load block bushing (11) on each end is slightly wider than the thickness of the slotted bracket plates (20) which allow the retaining nut (15) to be tightened completely without locking onto the slotted bracket plates (20). This allows the pivoting load block (10) to pivot which in turn allows the angle of the lead screw (40) to change slightly as the carrier moves along the radius slot. This pivoting action keeps the lead screw (40) from binding up when adjusted.

The threaded insert (12) could be removed and mounting holes could be drilled into the pivoting load block (10) in order to accept a hydraulic cylinder. This pivoting load block (10) can also be drilled for a stud that would ultimately keep a control motor stationary when mounted on the lead screw (40). The threaded insert (12) could be replaced with a rotating insert that allows for a stationary lead screw (40). This alteration would allow a gear to be placed on this rotating insert to allow for mechanical advantage through gear reduction.

C. Slotted Bracket Plates.

These plates are machined with mounting holes, a radius slot, and a machined hole for the pivoting load block (10). These plates bolt into the existing manufacturer's chassis four bar brackets and allow all parts to be joined together in the final assembly. These brackets can have various configurations in order to fit varying chassis types. The hemi joint carrier (30) moving up and down along the slotted radius hole, in these plates, provide for accurate placement of the four bar link.

The slotted bracket plates (20) have mounting holes that allow for bolting the entire assembly accurately into either the existing stock four bar mounting brackets or an altered four bar mounting bracket. There are two slotted bracket plates (20) in each complete assembly. They are separated at a precise width by spacer bushings (21). These spacer bushings (21) allow the slotted bracket plates (20) to be separated slightly wider than the hemi joint carrier (30). With the plates separation slightly wider, it allows the hemi joint carrier (30) to slide easily in between the slotted bracket plates (20) when adjustment is made to the lead screw (40). There are also spacer bushings (21) that are placed on the outside of the slotted bracket plates (20) in order to accurately place the assembly side to side in between the manufactures standard chassis four bar mounting brackets.

The slotted bracket plates (20) will change in overall shape, mounting hole configuration, slotted radius location, slotted hole radius, and pivot block hole location according to the chassis type and manufacturer.

D. Hemi Joint Carrier.

This carrier is a block machined to hold the hemi joint (34) connected to the end of one of the four bar links. The carrier also accepts the lead screw (40) which when turned creates the force required to move this carrier. When the lead screw (40) is turned, this carrier slides up and down in between the slotted bracket plates (20) and follows along the radius slots.

The hemi joint carrier (30) is machined in a manner to allow it to locate the hemi joint (34) in the correct position side to side in the car. It is machined to accept the lead screw (40). The lateral spacers (33) fit inside the hemi joint carrier (30) in order to provide additional side to side locating for the hemi joint (34). These lateral spacers (33) also bare side load when the four bars apply pressure in a side to side direction. These lateral spacers (33) are machined in order to accept the slot bushings (32) which fit inside the slotted radius in the slotted bracket plates (20). The specialized carrier bolt (31) slides through the lateral spacers (33), slot bushings (32), hemi joint (34) and the retaining flange nut (35) and is then threaded onto the specialized carrier bolt (31) in order to retain the entire assembly. The head of the specialized carrier bolt (31) and the retaining flange nut (35) are slightly wider than the slotted radius hole in the slotted bracket plates (20). This allows the hemi joint carrier (30) to fasten to the slotted bracket plates (20). The thicknesses of the slot bushings (32) are slightly thicker than the thickness of the slotted bracket plates (20). This allows the retaining flange nut (35) to be tightened and still not bind on the slotted bracket plates (20).

The lateral spacers (33) and hemi joint carrier (30) can be machined to offer a variety of side to side hemi joint (34) locations for each car.

E. Lead Screw.

This screw is threaded in order to allow it to thread through the pivoting load block (10) and connect to the hemi joint carrier (30). Rotating it provides pressure between the pivoting load block (10) and hemi joint carrier (30) to cause the hemi joint carrier (30) to move along the radius slot in the slotted bracket plates (20).

The lead screw (40) is a round shaft that contains sufficient threads in order for the hemi joint carrier (30) to travel from end to end on the slotted radius hole in the slotted bracket plates (20). One end must be machined in order to allow for attaching the hemi joint carrier (30). This attachment is achieved by utilizing carrier retaining castle nuts (41) and cotter pins (45). By utilizing the retaining castle nuts (41) along with cotter pins (45) it allows the lead screw (40) to fasten to the hemi joint carrier (30) without binding. The other end contains a hex head adjuster (42) that allows a wrench or socket to rotate it. Also on the same end of the lead screw (40) as the hex head adjuster (42) is the remote connector (43). This is an area above the hex head adjuster (42) that allows a remote control device to be connected to the lead screw (40). The lead screw (40) once adjusted can be locked into place by tightening the lock nut (44).

The lead screw (40) can be replaced by a hydraulic shaft in order to provide the same function as the lead screw (40). The lead screw (40) can also be fastened to the hemi joint carrier (30) via threads and a jam nut. This would allow the lead screw (40) to stay stationary while the threads in the pivoting load block (10) would turn in order to provide the force necessary to move the hemi joint carrier (30) along the slotted radius hole.

F. Assembly of Invention.

The hex head adjuster (42) is connected to the lead screw (40) which threads through the pivoting load block (10). The lead screw (40) then connects to the hemi joint carrier (30) and is retained using the carrier retaining castle nuts (41) and cotter pins (45). The hemi joint (34) is then connected to the hemi joint carrier (30) and slotted bracket plates (20) by sliding the specialized carrier bolt (31) through the slotted bracket plates (20), slot bushings (32), lateral spacers (33), and hemi joint (34). It is retained by threading the retaining flange nut (35) onto the end of the specialized carrier bolt (31) and tightening. At the same time the pivoting load block (10) with the pivoting load block bushings (11) are placed between the slotted bracket plates (20) and retained using the threaded stud (13), retaining washer (14), and retaining nut (15). Finally, the spacer bushings (32) are placed both between and outside the slotted bracket plates (20) and retained using bolts, nuts, and lock washers.

G. Assembly of Invention.

The lead screw (40) could be replaced with a hydraulic cylinder that fastens to the pivoting load block (10) and hemi joint carrier (30). The slotted bracket plates (10) will be constantly changing configuration to keep up with the latest developments of the four bar chassis brackets.

H. Operation of Preferred Embodiment.

Currently many race cars have what is referred to "four link" rear suspensions. This is to say that there are four bars (trailing arms) that fasten from the differential to the chassis to positively place the differential in the car. These bars have hemi joints (34) on each end; one end fastens to the chassis through the chassis manufacturer's stock trailing arm brackets. The trailing arms angle can currently be changed via a series of holes drilled in a radius along the stock trailing arm bracket. Changing this angle changes the handling characteristics of race car. In the beginning these holes were drilled at a distance of about one inch on center although as advancements have been made it has been shown that it is advantageous for this adjustment to be as fine as possible. Therefore, the holes are now drilled as closely together as they can possibly be. If a racer wants to change the angle of any given trailing arm the bolt that retains the trailing arm to the chassis must be removed and the bar moved to a new hole and then the bolt is replaced. The problem with this is that it is time consuming due to the amount of work required to remove the bolt and overcome the various pressures applied by other suspension parts and realign with the next hole to reinstall the bolt in the new position. This typically makes it unreasonable to make this trailing arm angle adjustment between races. Many times adjusting the trailing arm to the next hole would be too much of an adjustment and the racer is forced to choose between the lesser of two evils.

My invention will bolt into the standard manufacture chassis mounts or an altered trailing arm bracket by using spacer bushings (21) along with bolts, nuts, and lock washers that retain its placement. The hemi joint (34) within my invention will become a replacement for the stock hemi joint thus connecting the trailing arm to the invention. Once the invention is installed the racer can simply adjust the trailing arm angle by placing a wrench onto the hex head adjuster (42) and rotating the lead screw (40). The lead screw (40) when turned creates pressure between the pivoting load block (10) and hemi joint carrier (30) making it move one way or the other along the radius hole in the slotted bracket plates (20). This adjustment allows the racer to choose a precise location for the trailing arm and ultimately fine tune their handling. When in operation on the track my invention will maintain its trailing arm placement vertically in the car by applying pressure through the lead screw (40) into the pivoting load block (10). Furthermore, it will maintain its position horizontally through the slot bushings (32) that ride inside the slotted radius hole in the slotted bracket plates (20). Now adjusting the trailing arm angle will take a matter of seconds and can be fine-tuned precisely. The remote connector (43) on the lead screw (40) allows the racer to connect devices that will allow for remote adjustment of the trailing arm angles. An example of this is a flexible shaft or an electric motor that could rotate the lead screw (40).

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A vehicle trailing arm connection system, comprising:
   a bracket plate assembly for securing within a chassis mount, wherein said bracket plate assembly comprises a first bracket plate and a second bracket plate, wherein said first bracket plate includes a first slot and wherein said second bracket plate includes a second slot;
   a load block pivotally secured between an upper end of said first bracket plate and an upper end of said second bracket plate;
   a joint carrier slidably secured between said first slot of said first bracket plate and said second slot of said second bracket plate;
   a joint secured to said joint carrier, wherein said joint is adapted to be connected to a trailing arm of a vehicle; and
   a lead screw threadably extending through said load block, wherein an upper end of said lead screw extends above said bracket plate assembly and a lower end of said lead screw is connected to said joint carrier, said lead screw being operable to move said joint carrier along said first slot and said second slot.

2. The vehicle trailing arm connection system of claim 1, wherein said first bracket plate is secured to said second bracket plate with one or more spacer bushings.

3. The vehicle trailing arm connection system of claim 1, further comprising a first lateral spacer connecting a first side of said joint carrier to said first slot of said first bracket plate.

4. The vehicle trailing arm connection system of claim 3, further comprising a second lateral spacer connecting a second side of said joint carrier to said second slot of said second bracket plate.

5. The vehicle trailing arm connection system of claim 4, further comprising a first slot bushing adjacent to said first lateral spacer.

6. The vehicle trailing arm connection system of claim 5, further comprising a second slot bushing adjacent to said second lateral spacer.

7. The vehicle trailing arm connection system of claim 6, further comprising a carrier bolt extending through said first slot bushing, said first lateral spacer, said joint carrier, said second lateral spacer, and said second slot bushing.

8. The vehicle trailing arm connection system of claim 7, further comprising a retaining flange nut secured to a distal end of said carrier bolt.

9. The vehicle trailing arm connection system of claim 1, wherein said load block includes a threaded insert extending into an upper end of said load block for receiving said lead screw.

10. The vehicle trailing arm connection system of claim 9, further comprising a first threaded stub extending from a first side of said load block and a second threaded stub extending from a second side of said load block.

11. The vehicle trailing arm connection system of claim 10, wherein said first threaded stub extends through said first bracket plate and wherein said second threaded stub extends through said second bracket plate.

12. A vehicle trailing arm connection system, comprising:
a bracket plate assembly for securing within a chassis mount, wherein said bracket plate assembly comprises a first bracket plate and a second bracket plate, wherein said first bracket plate includes a first slot and wherein said second bracket plate includes a second slot;
a load block pivotally secured between an upper end of said first bracket plate and an upper end of said second bracket plate;
a joint carrier slidably secured between said first slot of said first bracket plate and said second slot of said second bracket plate;
a joint secured to said joint carrier, wherein said joint is adapted to be connected to a trailing arm of a vehicle; and
a hydraulic cylinder extending through said load block, wherein said hydraulic cylinder is connected to said joint carrier, said hydraulic cylinder being operable to move said joint carrier along said first slot and said second slot.

13. The vehicle trailing arm connection system of claim 12, wherein said load block includes a threaded insert extending into an upper end of said load block for receiving said lead screw.

14. The vehicle trailing arm connection system of claim 13, further comprising a first threaded stub extending from a first side of said load block and a second threaded stub extending from a second side of said load block.

15. The vehicle trailing arm connection system of claim 14, wherein said first threaded stub extends through said first bracket plate and wherein said second threaded stub extends through said second bracket plate.

16. A vehicle trailing arm connection system, comprising:
a trailing arm, wherein a first end of said trailing arm is fastened to a differential of a vehicle;
a chassis mount;
a bracket plate assembly secured within said chassis mount, wherein said bracket plate assembly comprises a first bracket plate and a second bracket plate, wherein said first bracket plate includes a first slot and wherein said second bracket plate includes a second slot, wherein said first bracket plate is secured to said second bracket plate with one or more spacer bushings;
a load block pivotally secured between an upper end of said first bracket plate and an upper end of said second bracket plate;
a joint carrier slidably secured between said first slot of said first bracket plate and said second slot of said second bracket plate;
a first lateral spacer connecting a first side of said joint carrier to said first slot of said first bracket plate;
a second lateral spacer connecting a second side of said joint carrier to said second slot of said second bracket plate;
a first slot bushing adjacent to said first lateral spacer;
a second slot bushing adjacent to said second lateral spacer;
a carrier bolt extending through said first slot bushing, said first lateral spacer, said joint carrier, said second lateral spacer, and said second slot bushing;
a retaining flange nut secured to a distal end of said carrier bolt;
a joint secured to said joint carrier, wherein said joint is adapted to be connected to a second end of said trailing arm;
a lead screw threadably extending through said load block, wherein an upper end of said lead screw extends above said bracket plate assembly and a lower end of said lead screw is connected to said joint carrier, wherein said load block includes a threaded insert extending into an upper end of said load block for receiving said lead screw;
a first threaded stub extending from a first side of said load block; and
a second threaded stub extending from a second side of said load block, wherein said first threaded stud extends through said first bracket plate and wherein said second threaded stub extends through said second bracket plate, said lead screw being operable to move said joint carrier along said first slot and said second slot.

* * * * *